July 18, 1961  F. J. SHONEBARGER  2,993,001
MATRIX GLASS FOR PHOSPHORS
Filed Oct. 30, 1956
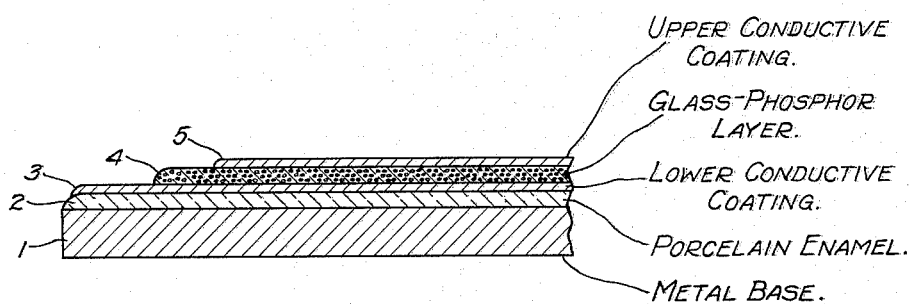
Inventor:
Francis J. Shonebarger,
by Otto Tichy
His Attorney.

United States Patent Office 2,993,001
Patented July 18, 1961

2,993,001
MATRIX GLASS FOR PHOSPHORS
Francis J. Shonebarger, Wickliffe, Ohio, assignor to General Electric Company, a corporation of New York
Filed Oct. 30, 1956, Ser. No. 619,161
3 Claims. (Cl. 252—301.6)

The present invention relates to matrix glasses for embedding phosphors.

Matrix glasses are used in phosphor screens used in conjunction with or as part of cathode ray, X-ray and ultraviolet ray generating devices as well as for the glass-phosphor dielectric of electroluminescent lamps.

Electroluminescent lamps include a light emitting layer of dielectric material between layers of conducting material. A glass-phosphor dielectric utilizing as the phosphor component electroluminescent materials including a sulphide, such as zinc sulphide, activated with a suitable metal, such as copper, has been found effective as the light emitting layer for such lamps.

In order for a glass to be useful as the glass component of such glass-phosphor dielectric the glass must be inert to zinc sulphide phosphor and should be a soft glass which flows readily at low temperatures, such as temperatures of about 700 to 750° C., to avoid diminution of the light emitting property of the phosphor while embedding the phosphor therein. In addition the glass must adhere to the supporting surface, which support may be of metal, enameled steel, glass or tile, must have a high dielectric constant and cover readily the phosphor enveloped thereby and also the supporting surface to which it is applied. The glass must not devitrify under conditions of manufacture and use of the electroluminescent lamp. Finally, the glass must be clear in the sense that it is light transmitting, take an electrically conductive coating, have good weathering properties and not be deeply colored.

The principal object of the present invention is to provide glass compositions useful as matrix glasses for embedding phosphors. Another object of the invention is to provide a glass-phosphor dielectric material for electroluminescent lamps. A further object of the invention is to provide a matrix glass for phosphor screens for cathode ray, X-ray and ultraviolet ray devices. Further objects and advantages of the invention will appear from the following detailed description of species of the invention.

Lead oxide is used extensively to produce soft, chemically stable glasses with good enameling properties. It is well known that lead oxide reacts readily with many sulphides at elevated temperature. Lead oxide has been found to be detrimental even in low concentrations in a matrix glass for embedding zinc sulphide type phosphors. Other possible congeners for producing a soft glass, such as vanadium pentoxide, tellurium dioxide and bismuth trioxide also react with the sulphide phosphor.

I have discovered that a glass inert with respect to sulphide phosphors and combining all the above properties to a high degree and which is, therefore, eminently satisfactory as a matrix glass for use in a glass-phosphor dielectric of an electroluminescent lamp is one containing antimony trioxide $Sb_2O_3$ in substantial amounts, such as in amounts of from about 20 to 25%, inclusive, of the total weight of the glass as calculated from the batch formula. This is unusual and unexpected in view of the reaction of other heavy metal oxides with sulphide phosphors, as mentioned above.

Glasses may be made with an antimony oxide content of from 5 to 30%, inclusive, of the total weight of the glass as calculated from the batch constituents. When used as a matrix glass for glass-phosphor dielectrics, the most desirable content of antimony oxide is from about 20 to 25%, inclusive, of the total weight of the glass. Below about 20% the advantageous properties of the glass derived from antimony oxide, such as good weatherability, softness and enameling ability, begin to decrease. Above approximately 25% devitrification tendencies begin to appear in the antimony oxide containing glass and it tends to be corrosive to platinum or refractory oxide crucibles in which the batch is melted.

Antimony oxide glasses containing the following glass forming materials in the percentage ranges given below and as calculated from the batch materials have been found useful as matrix glasses satisfying the above requirements.

| | Percent |
|---|---|
| Boric oxide ($B_2O_3$) | 28 to 45 |
| Antimony trioxide ($Sb_2O_3$) | 10 to 25 |
| Silica ($SiO_2$) | 10 to 25 |
| Zinc oxide (ZnO) | 10 to 20 |
| Sodium oxide ($Na_2O$) | } 9 to 15 |
| Sodium fluoride (NaF) | |
| Alumina ($Al_2O_3$) | 0 to 5 |
| Titanium dioxide ($TiO_2$) | 0 to 4 |

The above percentages are by weight of the entire glass.

The following glass compositions in weight percentages as calculated from their batches are given by way of examples of glasses embodying the invention. The linear coefficient of expansion of the glasses in a temperature range of 0–300° C. is included in the table.

| | 1 | 2 | 3 | 4 | 5 | 6 | 7 | 8 | 9 | 10 |
|---|---|---|---|---|---|---|---|---|---|---|
| $B_2O_3$ | 28.2 | 33.0 | 38.2 | 31.5 | 41.45 | 30.0 | 45.0 | 40.0 | 40.0 | 35.0 |
| $Sb_2O_3$ | 20.0 | 20.0 | 20.0 | 20.0 | 20.0 | 25.0 | 20.0 | 10.0 | 15.0 | 15.0 |
| $SiO_2$ | 20.0 | 20.0 | 20.0 | 16.0 | 10.0 | 12.0 | 10.0 | 20.0 | 20.0 | 25.0 |
| ZnO | 17.0 | 14.0 | 10.0 | 14.0 | 14.0 | 20.0 | 14.0 | 15.0 | 15.0 | 15.0 |
| $Na_2O$ | 5.0 | 10.0 | 2.0 | | | 5.0 | 11.0 | 5.0 | 5.0 | 5.0 |
| NaF | 7.8 | 1.0 | 7.8 | 14.5 | 14.55 | 8.0 | | 5.0 | 5.0 | 5.0 |
| $Al_2O_3$ | 2.0 | 2.0 | 2.0 | | | | | 5.0 | | |
| $TiO_2$ | | | | 4.0 | | | | | | |
| Exp. Coeff. $\times 10^{-7}$ | 89.6 | 84.6 | 79.9 | 92.0 | 95.0 | 90.0 | 89.0 | 76.4 | 78.7 | 80.8 |

The above glass compositions may be prepared by heating the glass batch materials in a platinum dish or kyanite crucible to a temperature of about 1100° C. for a period of 1¼ to 1½ hours to form the melt. After the batch ingredients have been melted the molten glass is poured out into a water bath to form a frit. After cooling, the frit is ground to a powder in a ball mill. As a vehicle for milling the glass, isopropyl alcohol or ethyl alcohol is preferred. After the glass has been milled to the desired fineness, which is suitably that at which the particles pass through a 325 mesh screen, the phosphor powder of suitable fine grain size is mixed therewith. A suspension of the glass-phosphor mixture is then applied to the supporting surface. In electroluminescent lamps the surface may be that of an enameled steel plate, a glass plate or a glazed tile which has had applied thereto a conducting metal or metal oxide film. The applied glass-phosphor layer is then fused to the supporting surface by heating the coated plate to a temperature such that the coating is at a temperature of about 700° C. to 750° C. for about 2 to 3 minutes. Phosphors unstable in air must be heated in an inert atmosphere such as dry nitrogen.

The above glass compositions are useful as a matrix for many phosphors in addition to zinc sulphide activated with copper. For example, the following phosphors have been successfully embedded in or enveloped by glasses of the above composition without deleterious reactions between the phosphor and the glass.

ZnCdSe:Cu
$Zn_3(PO_4)$:Mn
$ZnAl_2O_4$:Mn
ZnCdS:Ag
ZnCdS:Cu
ZnS:Ag
$Zn_2SiO_4$:Mn

In the single figure of the drawing accompanying and forming part of this specification an electroluminescent lamp having a glass-phosphor dielectric layer including a matrix glass of the present invention is shown in a cross-sectional view of a fragment of the lamp in which view the representation is schematic in that relative thicknesses of the various coatings are, in general, exaggerated relative to the thickness of the base member.

Referring to the drawing, the lamp shown comprises a metal base member or plaque 1 of steel or other suitable material coated with a porcelain enamel layer 2 on which there has been formed a conductive coating 3 which is hereinafter referred to as the lower conductive coating. The conductive coating 3 may be formed by any one of several known methods, for example, the enamel surface of the plaque may be painted with a solution of indium and tin salts, such as indium and tin chloride with a small percentage of tin tetrachloride, and fired for a short time at a temperature of approximately 600° C. or slightly higher but at a temperature lower than the softening temperature of the enamel. Alternatively, the plaque may be heated to the required temperature and then sprayed with a tin tetrachloride solution or a similar solution containing a small amount of antimony chloride. The formation of such conductive coatings on the surface of enamels and glasses is well known in the art and further description thereof is believed unnecessary for a complete understanding of the present invention which has to do with the glass-phosphor dielectric layer 4 constituting part of the electroluminescent lamp.

In accordance with the present invention the dielectric layer 4 consists of a mixture of the low melting glass disclosed above and an electroluminescent phosphor. The dielectric layer may be formed by spraying the conductively coated porcelain enameled plaque 1 with a non-aqueous suspension of phosphor such as zinc sulphide activated with copper, and glass powder, such as the glass of Example 4 in the above table. For example, a suspension of the phosphor and the glass powder in butyl acetate with a binder such as 1% by weight of the solids of ethyl cellulose may be used. In order to produce glass phosphor layers with as high a phosphor content as possible on the plaque 1 it is preferred to mix the phosphor and glass powder in an approximate weight ratio of from 1:4 to 1:6. After the layer 4 has been applied to the plaque 1 the coated plaque is then fired for approximately 2 to 3 minutes at a temperature of around 700° C. to fuse the glass-phosphor dielectric layer to the plaque.

An upper conductive coating 5 is then applied to the phosphor glass layer 4 preferably by spraying the layer at a suitable temperature with a tin salt spray. A preferred spray for the upper coating 5 consists of an alcoholic solution of tin tetrachloride and antimony trichloride of such concentration that the resulting oxide contains about 2% antimony oxide.

If the spray results in the coating 5 overlying the coating 3 a portion of the coating 5 along the edges of the plaque should be removed or treated so as to avoid a short circuit between the conductive coatings. The electrolytic procedure disclosed and claimed in co-pending Froelich application Serial No. 588,664, filed June 1, 1956, now U.S. Patent No. 2,904,456 and assigned to the assignee of this application may be used for this purpose. This procedure includes immersing the edges of the plaque in an aqueous electrolyte non-reactive with the vitreous layer 4 and passing an electric current through the electrolyte with the conductive coating 5 acting as cathode. Sodium chloride or sulphide are suitable salts for use in the electrolyte.

With electroluminescent lamps of this structure the glass compositions identified as examples 4, 5 and 6 in the table and having a coefficient of expansion of about $90 \times 10^{-7}$ and higher are useful as the glass component of the glass-phosphor dielectric layer 4 on the enameled steel plaque 1. The glasses with a lower expansion coefficient, such as the glasses of examples 2 and 3, may be used on lime glass or glazed tile plaques.

In addition to electroluminescent lamps, glasses embodying the invention are also useful in phosphor containing screens for cathode ray, X-ray and ultraviolet ray devices. The phosphors responsive to the radiations produced by such devices may be embedded in the glass to form a screen. The glasses have been found permeable to X-rays so that the X-ray excitation of the phosphor enveloped in the glass is effected without substantial absorption of the exciting X-ray radiation. Of course, when used in connection with cathode ray devices some absorption of the exciting radiation takes place but not to the extent as to make the glass ineffective for use in such devices.

While numerous glass compositions embodying the invention and a method of making the glass melts and applying the glass-phosphor mixture have been disclosed herein it will be understood that this is by way of example and that it is contemplated that additional materials, other phosphors and other methods of application may be used by those skilled in the art without departure from the scope of the invention as defined in the appended claims.

What I claim as new and desire to secure by Letters Patent of the United States are:

1. A glass phosphor dielectric consisting essentially of electroluminescent phosphor and soft glass embedding the phosphor, said glass consisting essentially of by weight of the glass about 28 to 45% boric oxide, about 10 to 25% silica, about 10 to 20% zinc oxide, about 9 to 15% alkali metal compound from the group consisting of alkali metal oxides and halides and mixtures thereof, about 10 to 25% antimony oxide, 0 to 5% alumina and 0 to 4% titanium dioxide, said phosphor being zinc sulphide phosphor, said phosphor and said glass having an approximate weight ratio of from about 1:4 to 1:6, inclusive.

2. A glass-phosphor film consisting essentially of zinc sulphide phosphor powder embedded in soft glass, said glass being an antimony borosilicate glass wherein antimony oxide constitutes about 10 to 25%, inclusive, by weight of the glass, said glass being present in major amount in the film and flowing readily at temperatures of about 700 to 750° C. to envelop the phosphor powder without substantial diminution of the light-emitting property of the phosphor.

3. A glass-phosphor film consisting essentially of zinc sulphide phosphor powder embedded in soft glass, said glass being an antimony borosilicate glass wherein antimony oxide constitutes about 10 to 25%, inclusive, by weight of the glass, said glass being present in major amount in the film and flowing readily at temperatures of about 700 to 750° C. to envelop the phosphor powder without substantial diminution of the light-emitting property of the phosphor, said glass having a coefficient of expansion of about 76 to 95 x $10^{-7}$, inclusive.

References Cited in the file of this patent

UNITED STATES PATENTS

| | | |
|---|---|---|
| 2,049,765 | Fischer | Aug. 4, 1936 |
| 2,059,640 | Hood | Nov. 3, 1936 |
| 2,097,275 | Fischer | Oct. 26, 1937 |
| 2,099,602 | Fischer | Nov. 16, 1937 |
| 2,224,516 | Kerstan | Dec. 10, 1940 |
| 2,573,200 | Hushley | Oct. 30, 1951 |
| 2,584,974 | Armistead | Feb. 12, 1952 |
| 2,857,541 | Etzel | Oct. 21, 1958 |

FOREIGN PATENTS

| | | |
|---|---|---|
| 460,210 | Great Britain | Jan. 22, 1937 |

OTHER REFERENCES

Ser. No. 395,364, Berger et al. (A.P.C.), Published May 11, 1943.